United States Patent [19]
Fujita et al.

[11] Patent Number: 4,835,577
[45] Date of Patent: May 30, 1989

[54] NEGATIVE/POSITIVE MICROFILM DISCRIMINATING SYSTEM

[75] Inventors: Masafumi Fujita; Yasushi Yamade; Takao Saijo, all of Osaka, Japan

[73] Assignee: Minolta Camera Kabushiki Kaisha, Osaka, Japan

[21] Appl. No.: 155,351

[22] Filed: Feb. 12, 1988

[30] Foreign Application Priority Data

Feb. 13, 1987 [JP] Japan ................... 62-31888

[51] Int. Cl.⁴ ................... G03B 27/74; G03B 27/80
[52] U.S. Cl. ................... 355/68; 355/30; 355/204
[58] Field of Search ................... 355/14 CH, 14 E, 30, 355/68, 77

[56] References Cited

U.S. PATENT DOCUMENTS

| | | | |
|---|---|---|---|
| 4,239,374 | 12/1980 | Tatsumi et al. | 355/14 E |
| 4,341,463 | 7/1982 | Kashiwagi et al. | 355/14 CH |
| 4,610,537 | 9/1986 | Matsumoto | 355/68 |
| 4,650,316 | 3/1987 | Matsumoto | 355/68 X |
| 4,660,965 | 4/1987 | Matsumoto | 355/68 X |
| 4,724,461 | 2/1988 | Rushing | 355/14 E X |
| 4,737,819 | 4/1988 | Taniguchi | 355/14 E |

FOREIGN PATENT DOCUMENTS 49-16647  4/1974  Japan.
60-101527  6/1985  Japan.

*Primary Examiner*—Richard A. Wintercorn
*Attorney, Agent, or Firm*—Price, Gess & Ubell

[57] ABSTRACT

A negative-positive microfilm discriminating system for use in a microfilm reader/printer apparatus, comprising a sensor for detecting the densities at a plurality of spots within an image zone of a microfilm strip, and a control circuit for discarding a fraction of the density data when the fraction of the data is representative of a density occurring at less than a predetermined percentage of the total number of spots and discriminating whether the microfilm strip is a negative or a positive on the basis of the remaining fraction of the density data.

7 Claims, 14 Drawing Sheets

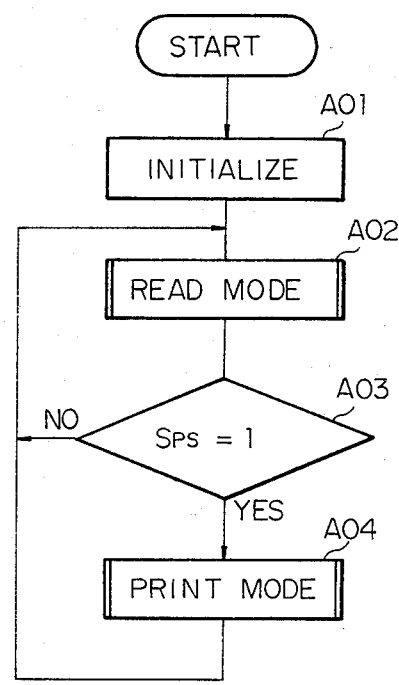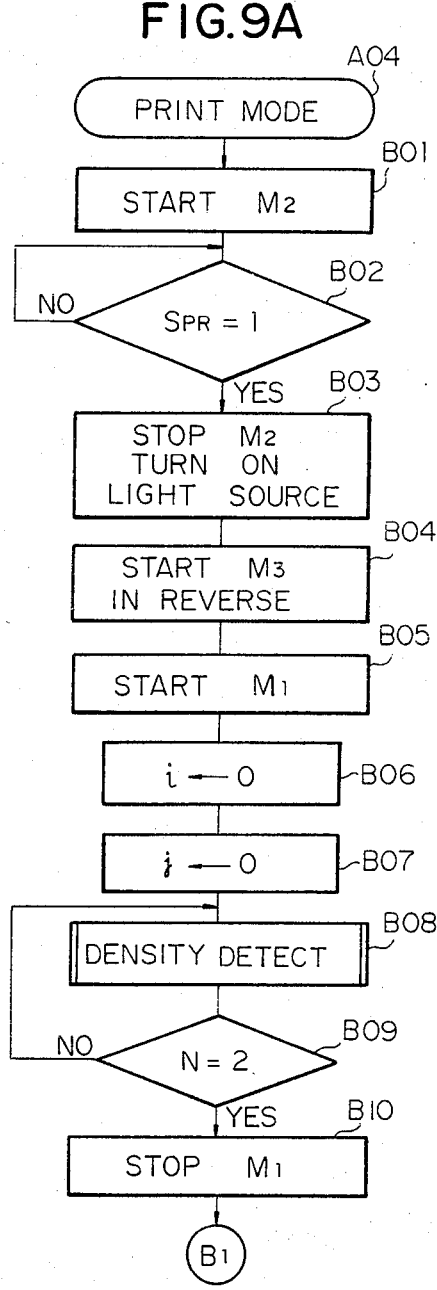

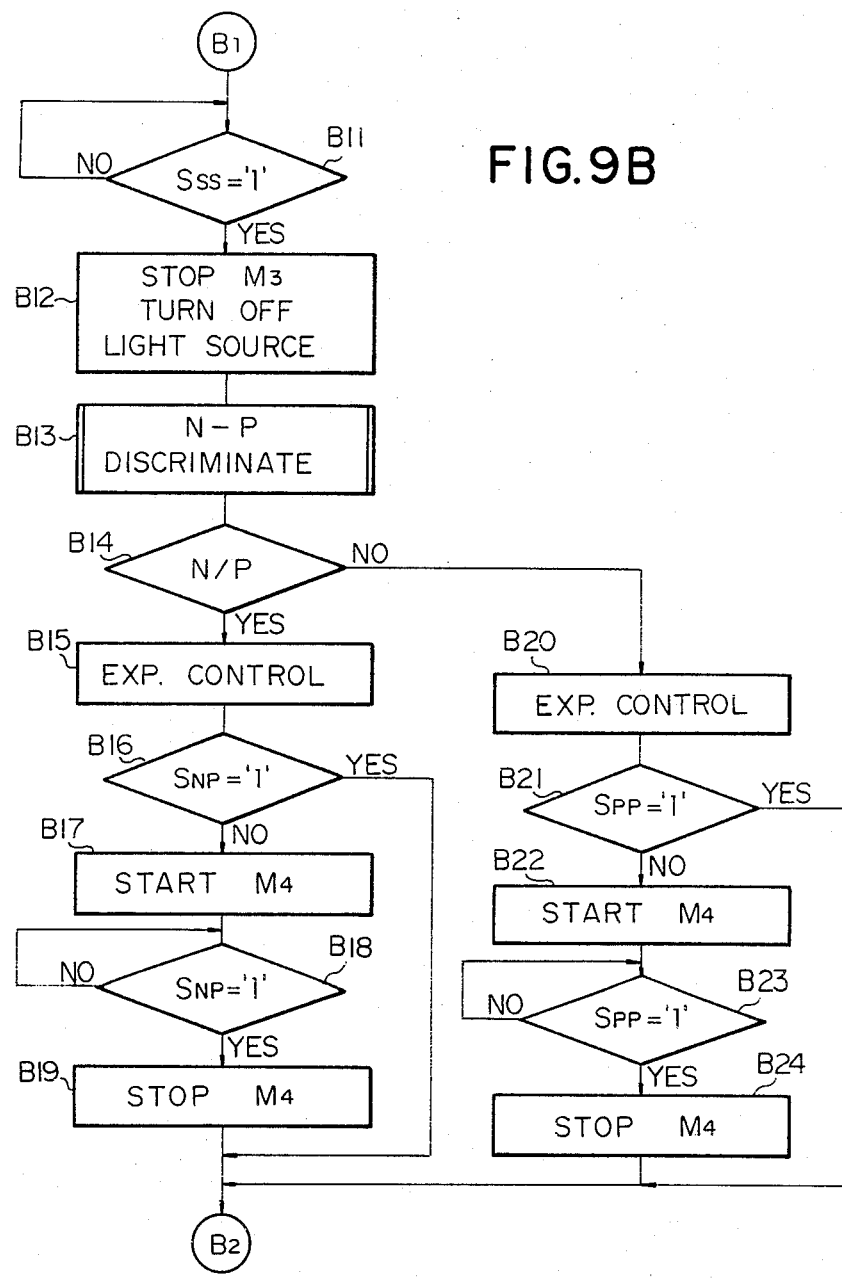

FIG. 13B
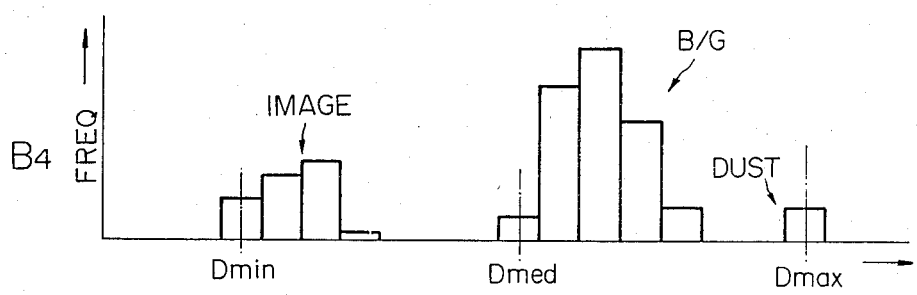
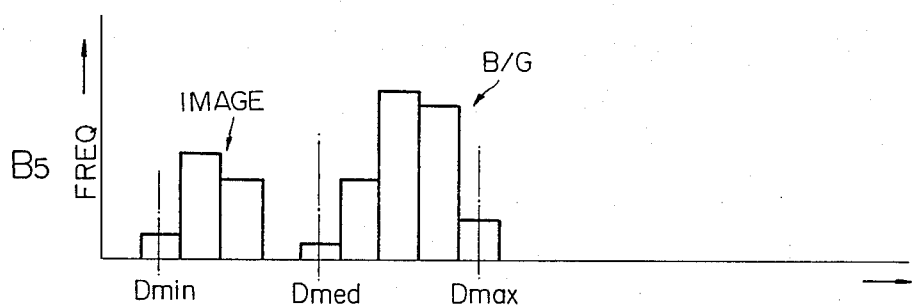
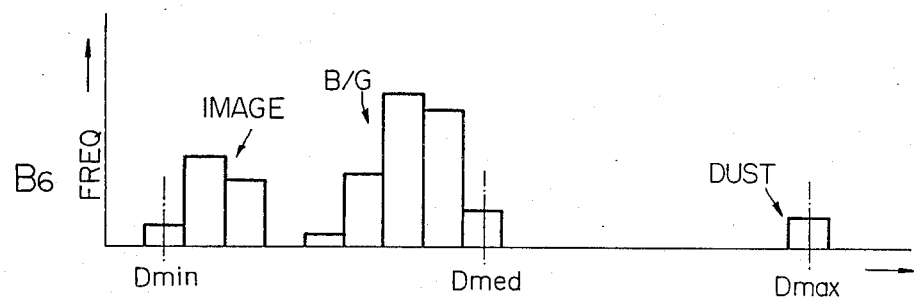

NEGATIVE/POSITIVE MICROFILM DISCRIMINATING SYSTEM

FIELD OF THE INVENTION

The present invention relates to a microfilm handling apparatus and, more particularly, to a negative-positive microfilm discriminating system for use in a microfilm reader/printer apparatus and the like. Such a negative-positive microfilm discriminating system is used to discriminate whether an image frame on a microfilm strip is given in the form of a negative or in the form of a positive.

BACKGROUND OF THE INVENTION

Microfilm strips for use in a microfilm reader/printer apparatus or the image frames on such a microfilm strip include those given in the form of negatives or those given in the form of positives. In whichever form the microfilm strips or the image frames may be given, it is preferable that the images thereon be reproduced or printed in positive. It is for this reason necessary for a microfilm reader/printer apparatus to discriminate whether the microfilm strip or the image frame of the microfilm strip currently in use is a negative or a positive and to establish operational conditions adapted for the printing of the image in positive.

Such discrimination of a microfilm strip or an image frame between negative and positive may be effected by visual inspection of the microfilm strip or the image frame. Discrimination by human intervention is reliable in the result but is not acceptable for high-speed operations. Mechanized and otherwise automated negative/positive microfilm discriminating systems have therefore been proposed and put to use. Known examples of such systems are disclosed in Japanese Patent Specification No. 49-16647 and U.S. Pat. No. 4,341,463.

The negative/positive microfilm discriminating system taught in Japanese Patent Specification No. 49-16647 utilizes the fact that the density in a non-image area between image areas of an image frame differs between negative and positive film strips. An image frame is thus determined to be a negative or a positive through detection of the density of such a non-image area of the frame.

On the other hand, the microfilm discriminating system disclosed in U.S. Pat. No. 4,341,463 illuminates a particular area of an image frame of a microfilm strip to detect the density of the background area (viz., the base density of the microfilm strip) of the image frame from the quantity of the light transmitted through the particular area of the frame. The density of the background area of the image frame thus detected is compared with a prescribed reference value for determining whether the image frame is a negative or a positive.

A known negative/positive microfilm discriminating system of the former type has a problem in that the result of the discrimination may be erred since the discrimination is made on the basis of the density in a non-image area of an image frame, not directly from the image on the frame. In a prior-art system of the latter type, discrimination of an image frame between negative and positive is made directly from the image on the frame and the likelihood of the system making an erred decision will be less than that in a system of the former type. The system of the latter type however has a drawback in that, when there is a stain or dust on a microfilm strip or in the optical arrangement of the system, the data representative of the density distribution of the image will contain information relating to the density of such a stain or dust. The use of such data for the discrimination of the image frame between negative and positive would result in an erred decision. In a known negative/positive microfilm discriminating system of either type, no consideration is given to the presence of a stain or dust on a microfilm strip or in the optical arrangement of the system and, accordingly, the effect resulting from the presence of a stain or dust is unavoidable in the system.

SUMMARY OF THE INVENTION

It is, therefore, an important object of the present invention to provide an improved negative/positive microfilm discriminating system which is capable of discriminating an image frame of a microfilm strip between negative and positive directly from the image on the frame.

It is another important object of the present invention to provide an improved negative/positive microfilm discriminating system eliminating the effect resulting from the presence of a stain or dust on a microfilm strip per se or in the optical arrangement of the system.

It is, thus, a prime object of the present invention to provide an improved negative/positive microfilm discriminating system which is reliable in performance.

A negative-positive microfilm discriminating system proposed by the present invention is characterized specifically in that an appropriate patterned image zone is defined on an image frame of a microfilm strip whereupon densities are detected at a plurality of spots within such a zone.

Thus, in accordance with the present invention, there is provided a negative-positive microfilm discriminating system for use in a microfilm handling apparatus, comprising (a) density detecting means for detecting the, densities, at a plurality of spots within an image zone of a microfilm strip, (b) means for discarding a fraction of the density data when the fraction of the data is representative of a density occurring at less than a predetermined percentage of the total number of spots, (c) negative-positive discriminating means for discriminating whether the microfilm strip is a negative or a positive on the basis of the remaining fraction of the density data.

In a preferred embodiment of a negative-positive microfilm discriminating system according to the present invention, the predetermined percentage as above mentioned is preferably selected at approximately 1 percent.

On the other hand, the discarding means which forms part of a negative-positive microfilm discriminating system according to the present invention is preferably arranged to be operative to disregard a fraction of the data if the fraction of the data is representative of a density detected at not more than a second predetermined percentage of the total number of spots and if there is no density detected which is immediately adjacent in graduation to the density represented by the fraction. In such a negative-positive microfilm discriminating system according to the present invention, the second predetermined percentage is preferably selected at approximately 5 percent.

It should however been borne in mind that the numerical values as above specified are merely by way of example and, for this reason, may be varied appropriately by preference or if neccesary.

BRIEF DESCRIPTION OF THE DRAWINGS

The features and advantages of a negative-positive microfilm discriminating system according to the present invention will be more clearly appreciated from the following description taken in conjunction with the accompanying drawings in which like reference numerals designate similar or corresponding units, members and elements and in which:

FIG. 8 is a flowchart showing an example of the main rr which may be executed by a central processing unit which forms part of the control circuit included in the arrangement illustrated in FIG. 7;

FIGS. 9A, 9B and 9C is a flowchart showing the steps of a print mode ss included in the rr illustrated in FIG. 8;

FIGS. 13A and 13B are histogrammic representations of the graduated data detected from different sample image blocks.

DESCRIPTION OF THE PREFERRED EMBODIMENT

Figure 1:
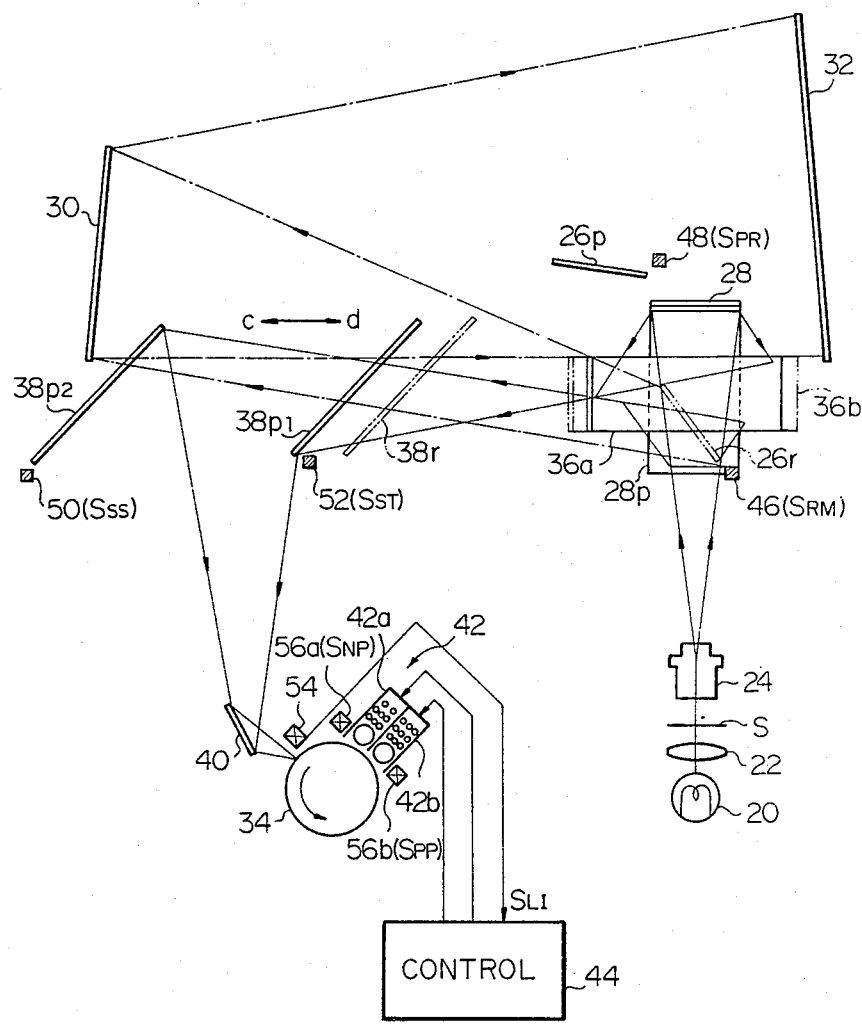
FIG. 1 is a side elevation view schematically showing the arrangements of read and print mirror systems of a microfilm reader/printer apparatus incorporating a negative-positive microfilm discriminating system embodying the present invention.
Figure 2:
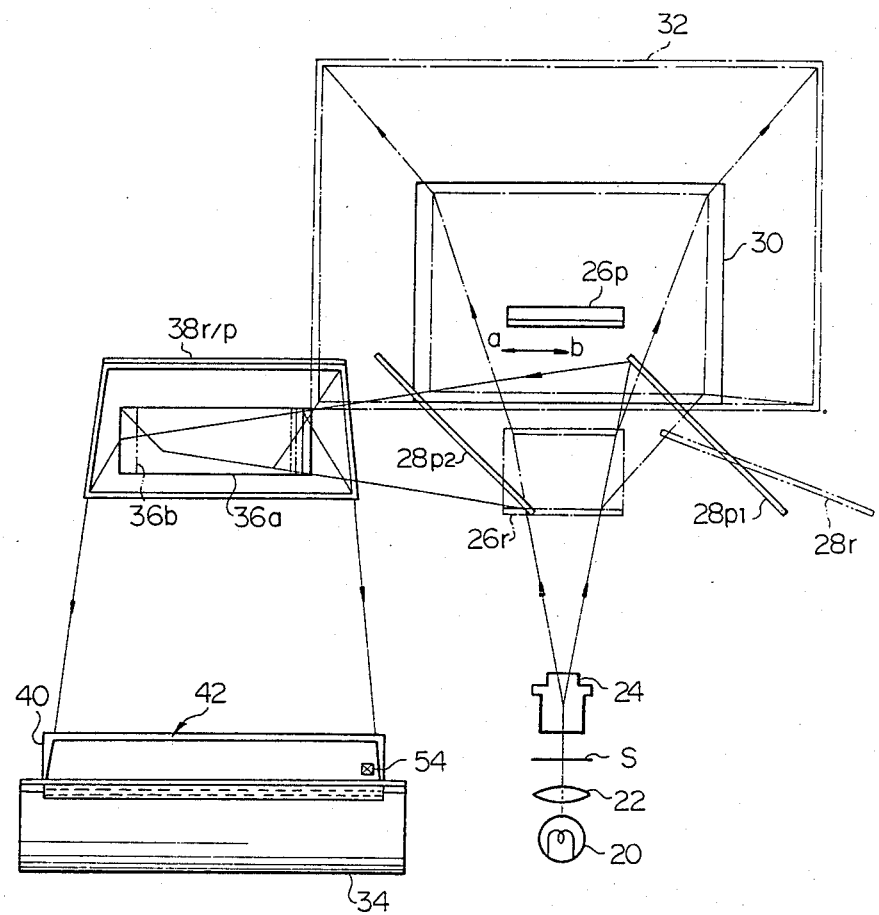
FIG. 2 is a schematic front elevation view of the read and print mirror systems illustrated in FIG. 1.
Figure 3:
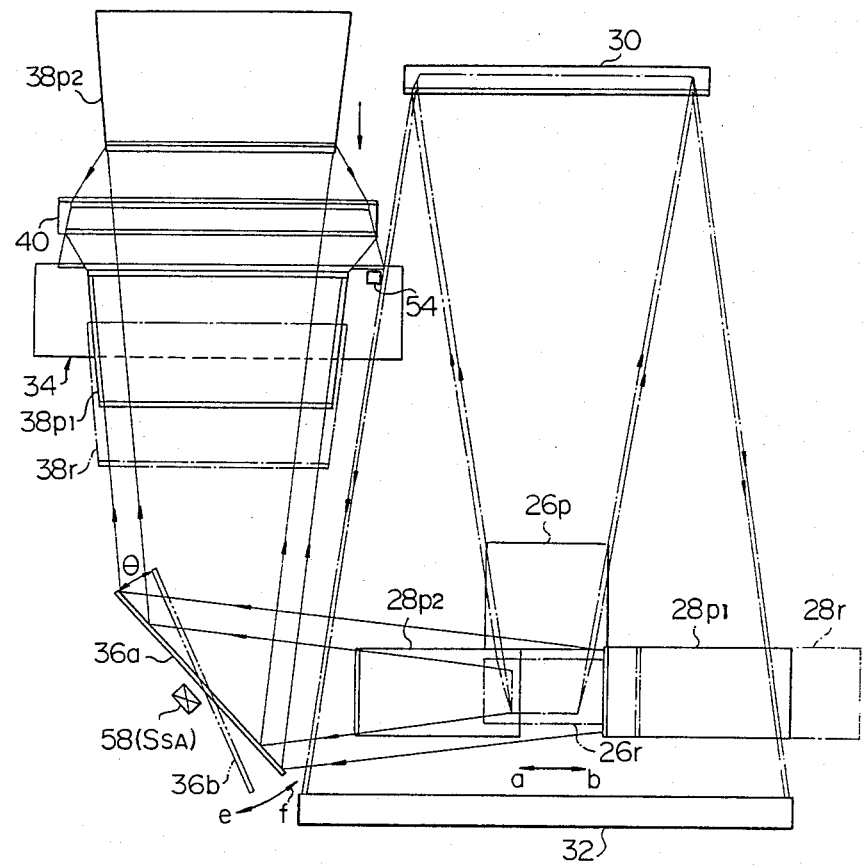
FIG. 3 is a schematic plan of the mirror systems illustrated in FIGS. 1 and 2.

In FIGS. 1, 2 and 3 is shown the read and print mirror systems of a microfilm reader/printer apparatus to which the present invention appertains. In these FIGS. 1 to 3, subscripts r and p are affixed to the reference numeral assigned to a movable and/or rockable reflector mirror to indicate the positions to which the reflector mirror is to be moved and/or swung during read (r) and print (p) modes of operation, respectively. Furthermore, the reflector mirrors and the beams of light travelling therefrom during a read mode of operation are indicated by dot-and-dash lines while those during a print mode of operation are indicated by full lines in FIGS. 1 to 3.

Referring now to FIGS. 1, 2 and 3, a beam of light emanating upwardly from a light source unit 20 provided in the reader/printer apparatus is first transmitted through a condenser lens 22 and the resultant collimated beam of light is incident on a microfilm strip S extending perpendicularly to the path of light from the condenser lens 22. The microfilm strip S is driven to travel horizontally by suitable drive means (not shown) and has one of its image frames located in the path of light from the condenser lens 22. The light which has passed through the microfilm strip S is magnified and directed selectively toward a first reader reflector mirror 26 in a position indicated at 26r or toward a first printer reflector mirror 28 in a position indicated at 28p by means of a projection lens unit 24 located over and in alignment with the condenser lens 22. During a read mode of operation, the magnified beam of light issuing from the projection lens unit 24 is directed toward the first reader reflector mirror 26 in the position 26r and, during a print mode of operation, the beam of light is directed toward the first printer reflector mirror 28 in the position 28p.

These reader and printer reflector mirrors 26 and 28 are movable and rockable independently of each other within the apparatus. During a read mode of operation, the first reader reflector mirror 26 is held in a position downwardly inclined forwardly in the path of light from the projection lens unit 24 as indicated at 26r in FIGS. 1 to 3, while the first printer reflector mirror 28 is, during a print mode of operation, held in a position sidewise inclined in the path of light from the projection lens unit 24 as indicated at 28p in FIG. 1. During a print mode of operation, the first printer reflector mirror 28p (FIG. 1) is sidewise movable between positions indicated at 28p1 and 28p2 in FIGS. 2 and 3 through the path of light from the projection lens unit 24.

The beam of light directed from the projection lens unit 24 to the first reader reflector mirror 26r during a read mode of operation is rearwardly re-directed toward a second reader reflector mirror 30 which is fixedly positioned rearwardly of a front viewing screen 32. From the second reader reflector mirror 30, the beam of light is forwardly re-directed toward the viewing screen 32 provided at the front of the apparatus. The first and second read reflector mirrors 26 and 30 form in combination a read mirror system of the reader/printer apparatus to which the present invention appertains. On the other hand, the beam of light directed from the projection lens unit 24 to the first printer reflector mirror 28p (FIG. 1) during a print mode of operation travels by way of the other reflector mirrors of the print mirror system and through a slit (not shown) to a photosensitive drum 34 positioned at the bottom of the apparatus. These reflector mirrors of the print mirror system may include, a rockable second printer reflector mirror 36, a movable third printer reflector mirror 38 having a parallel translatory motion, and a stationary fourth printer reflector mirror 40 as shown.

During a read mode of operation, the first printer reflector mirror 28 which forms part of the print mirror system is maintained in a position sidewise swung downwardly and retracted from the path of light from the projection lens unit 24 toward the first reader reflector mirror 26r. Under this condition, the third printer reflector mirror 38 is held in a position indicated at 38r and thus retracted from the path of light from the second reader reflector mirror 30 toward the screen 32, as will be seen from FIGS. 1 and 3.

During a print mode of operation, on the other hand, the first reader reflector mirror 26 which forms part of the read mirror system is moved from the inclined position 26r to a substantially horizontal raised position indicated at 26p in FIGS. 1, 2 and 3 to withdraw from the path of light from the projection lens unit 24 toward the first printer reflector mirror 28p. Under this condition, the first printer reflector mirror 28 which has been maintained in the retracted position 28r is tilted up to a position indicated at $28_{p1}$ and is moved sidewise from the position $28_{p1}$ to a position indicated at $28_{p2}$ in a direction indicated by arrowhead a in FIGS. 2 and 3 through the path of light from the projection lens unit 24. Concurrently as the first printer reflector mirror 28 is thus moved from the position 28r to the position $28_{p2}$ through the position $28_{p1}$, the third printer reflector mirror 38 which has been held in the retracted position 38r is rearwardly moved through a position indicated at $38_{p1}$ to a position indicated at $38_{p2}$ in a direction indicated by arrowhead c in FIG. 1. The movement of the first printer reflector mirror 28 from the position 28r to the position $28_{p2}$ and the movement of the third printer reflector mirror 38 from the position 38r to the position $38_{p2}$ are used for the preliminary scanning of the microfilm strip. The preliminary scanning of the microfilm strip is started simultaneously with the start of the printer reflector mirrors 28 and 38 from the respective positions $28_{p1}$ and $38_{p1}$ and is terminated when the mirrors 28 and 38 reach the respective positions $28_{p2}$ and $38_{p2}$ thereof.

After the first and third printer reflector mirrors 28 and 38 have thus reached the positions $28_{p2}$ and $38_{p2}$, respectively, the first printer reflector mirror 28 is moved back from the position $28_{p2}$ to the position $28_{p1}$ in a direction indicated by arrowhead b in FIGS. 2 and 3 through the path of light from the projection lens unit 24. Concurrently, the third printer reflector mirror 38 is moved back from the position $38_{p2}$ to the position $38_{p1}$ as indicated by arrowhead d in FIG. 1. These backward movements of the printer reflector mirrors 28 and 38 are used for the real scanning of the microfilm strip. The real scanning of the microfilm strip is started simultaneously with the start of the printer reflector mirrors 28 and 38 from the respective positions $28_{p2}$ and $38_{p2}$ and is terminated when the mirrors 28 and 38 reach the respective positions $28_{p1}$ and $38_{p1}$ thereof. During this real scanning of the microfilm strip, the rockable second printer reflector mirror 36 is maintained at rest so that the image on the image frame of the microfilm strip which is currently aligned with the path of light from the condenser lens 22 is optically scanned by the print mirror system from one longitudinal end (assumed to be the left end in FIGS. 2 and 3) of the frame toward the other. The image picked up from the microfilm strip in this manner is finally projected from the fourth printer reflector mirror 40 onto the peripheral surface of the photosensitive drum 34. The photosensitive drum 34 is driven for rotation at a peripheral speed related to the speeds of movement of the first and third printer reflector mirrors 28 and 38 from the position $28_{p2}$ to position $28_{p1}$ and from the position $38_{p2}$ to position $38_{p1}$. Accordingly, an electrostatic latent image corresponding to the image information carried by the beam of light incident on the drum 34 is formed on the sensitized peripheral surface of the drum 34 as well known in the art. Such a latent image is reproduced into a visible toner image on a suitable record medium by means of a developing unit 42 which is shown comprising two developing stages 42a and 42b in FIG. 1. The stages 42a and 42b of the developing unit 42 are negative-to-positive and positive-to-positive developing stages, respectively, and are selectively put into operation 42a under the control of a control circuit 44 incorporating a central processing unit as will be described in detail.

The microfilm reader/printer apparatus having the read and print mirror systems constructed and arranged as hereinbefore described has various sensors and detectors incorporated therein in conjunction with the mirror systems. In FIG. 1, these sensors and detectors are shown including first and second position sensors 46 and 48 associated with the first reader reflector mirror 26, and third and fourth position sensors 50 and 52 associated with each of the first and third printer reflector mirrors 28 and 38. The first position sensor 46 is responsive to the read mode position 26r of the first reader reflector mirror 26 and provides means to produce a read mode signal $S_{RM}$ when the reflector mirror 26 is in the read mode position 26r. The second position sensor 48 is responsive to the print mode position 26p of the first reader reflector mirror 26 and provides means to produce a print-ready signal $S_{PR}$ when the reader reflector mirror 26 is moved from the read mode position 26r to the print mode position 26p. The third position sensor 50 is responsive to the real scan start position $38_{p2}$ of the third printer reflector mirror 38 and provides means to produce a scan start signal $S_{SS}$ when the printer reflector mirror 38 is moved to the real scan start position $38_{p2}$ from the position $38_{p1}$ thereof. The movement of the third printer reflector mirror 38 being concurrently accompanied by the movement of the first printer reflector mirror 28, the third position sensor 50 is responsive also to the real scan start position $28_{p2}$ of the first printer reflector mirror 28. The fourth position sensor 52 is responsive to the real scan stop position $38_{p1}$ of the third printer reflector mirror 38 and accordingly to the real scan stop position $28_{p1}$ of the first printer reflector mirror 28 and provides means to produce a scan stop signal $S_{ST}$ when the printer reflector mirrors 28 and 38 are moved from the real scan start positions $28_{p2}$ and $38_{p2}$ to the position $28_{p1}$ and $38_{p1}$, respectively, thereof.

The sensors and detectors incorporated in conjunction with the read and print mirror systems further include a light intensity sensor 54 and negative-to-positive and positive-to-positive develop sensors 56a and 56b. The light intensity sensor 54 is located in the vicinity of the path of light to be projected from the fourth printer reflector mirror 40 toward the photosensitive drum 34 and is responsive to the intensity of light to be incident on the drum 34 and accordingly the quantity of light or "exposure volume" with which the microfilm strip S is illuminated with the light from the light source unit 20. Thus, the light intensity sensor 54 provides means to produce a light intensity signal $S_{LI}$ indicative of the detected exposure volume used for the real scanning of the microfilm strip S or of the density distribution detected during preliminary scanning of the microfilm strip S. As will be understood as the description proceeds, the light intensity signal $S_{LI}$ produced by the light intensity sensor 54 during preliminary scanning of the frame in a print mode of operation indicates the density distribution of the image on a given image frame of the microfilm strip S. Such a light intensity sensor 54 may be implemented by, for example, a cadmium sulfide photoelectric transducer having a photosensitive area measuring 0.3 mm in diameter to be capable of reliably detecting an image in the form of a fine line. The negative-to-positive and positive-to-positive develop sensors 56a and 56b are located in the vicinity of the developing stages 42a and 42b, respectively, of the developing unit 42 and are operative selectively under the control of the control circuit 44. The negative-to-positive and positive-to-positive develop sensors 56a and 56b provide means to produce signals $S_{NP}$ and $S_{PP}$ respectively when the negative-to-positive and positive-to-positive developing stages 42a and 42b of the developing unit 42 are selected and found ready for operation. The various signals produced by the sensors described are all supplied to the control circuit 44.

The second printer reflector mirror 36 is used for re-directing light from the first printer reflector mirror 28 toward the third printer reflector mirror 38 during a print mode of operation and is rockable through a predetermined angle of swing $\theta$ between first and second angular positions 36a and 36b about a fixed vertical axis as indicated by arrowheads e and f in FIG. 3. The printer reflector mirror 36 is to be driven to swing a controlled number of times between these two angular positions 36a and 36b during preliminary scanning of the microfilm strip S as will be described in more detail. The angular displacement of the printer reflector mirror 36 producing such rocking motions is detected by a swing angle sensor 58 which provides means to produce an swing angle signal $S_{SA}$ which is variable with the detected angular displacement of the printer reflector mirror 36 from the first angular position 36a thereof. During the real scanning of the microfilm strip in a print mode of operation, the second printer reflector mirror 36 is maintained at the position 36a thereof.

Figure 4:
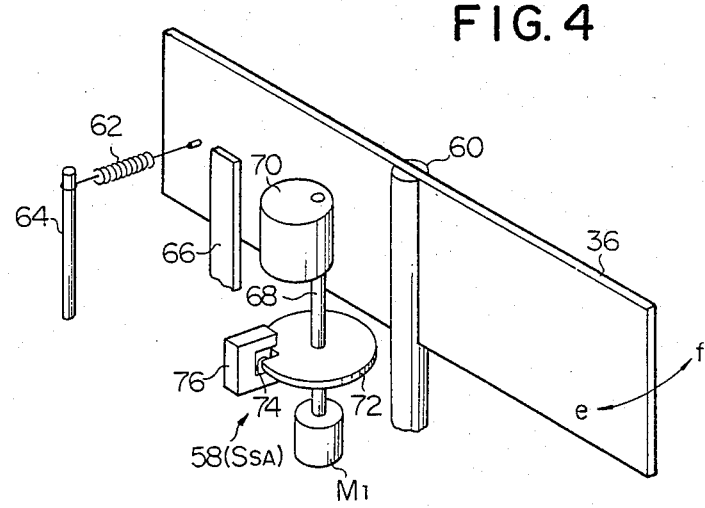
FIG. 4 is a fragmentary perspective view showing the arrangement of a printer reflector mirror which forms part of the mirror systems illustrated in FIGS. 1 to 3.
Figure 5:
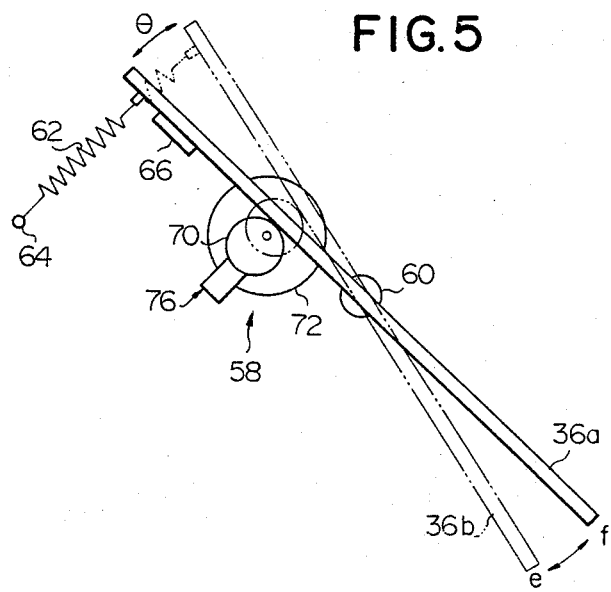
FIG. 5 is a plan view showing the two angular positions of the printer reflector mirror in the arrangement illustrated in FIG. 4.

FIGS. 4 and 5 show the arrangement in which the printer reflector mirror 36 which is driven to be rockable between two positions 36a and 36b thereof with the swing angle sensor 58 provided in conjunction with the mirror 36.

Referring to FIGS. 4 and 5, the second printer reflector mirror 36 is supported on a vertical shaft 60 which is journalled at one end to any stationary structural member (not shown) of the apparatus and is thus rotatable about the center axis of the shaft 60. The printer reflector mirror 36 is urged to turn in the direction of arrow f toward the second angular position 36a thereof by suitable bias means which is herein shown comprising a preloaded helical tension spring 62. The tension spring 62 is anchored at one end to the printer reflector mirror 36 and at the other to an anchor element 64 which is also fixed to a suitable structural member (not shown) of the apparatus. The rotation of the printer reflector mirror 36 in the direction of arrow f is limited by a stop member 66 which is fixed with respect to the shaft 60. The printer reflector mirror 36 is brought into contact with the stop member 66 when turned in the direction of arrow f by means of the spring 62 and is thereby prevented from being further turned in the direction of arrow f. The stop member 66 is located so that the printer reflector mirror 36 is allowed to turn through an angle $\theta$ from the first angular position 36a to the second angular position 36b thereof.

The printer reflector mirror 36 is driven for rotation about the center axis of the shaft 60 by means of a motor $M_1$ which has an output shaft 68 extending in parallel with the shaft 60 and connected at its leading end to an eccentric cam member 70. The cam member 70 has a cylindrical peripheral surface rollable on the reverse surface of the reflector mirror 36 and is carried on the output shaft 68 of the motor $M_1$ such that the center axis of the motor output shaft 68 is offset from the center axis of the cam member 70 per se. The maximum angle of displacement, or angle of swing $\theta$, of the printer reflector mirror 36 between the first and second angular positions 36a and 36b thereof is thus dictated by the amount of offset between the respective center axes of the motor output shaft 68 and the cam member 70. As the cam member 70 makes a single full turn about the center axis of the motor output shaft 68, the printer reflector mirror 36 is caused to swing first from the position 36a to the position 36b in the direction of arrow e and thereafter backwardly from the position 36b to the position 36a in the direction of arrow f each through the angle $\theta$. The motor $M_1$ is controlled to drive the cam member 70 for a predetermined number N of full turns to produce such rocking motions of the printer reflector mirror 36 repeatedly during each preliminary scanning of the microfilm strip S. The motor $M_1$ operates under the control of the control circuit shown in FIG. 7 as will be described in mode detail.

The swing angle sensor 58 comprises disk 72 concentrically carried on the output shaft 68 of the motor $M_1$ and has a slit 74 formed in its outer peripheral portion. In conjunction with the disk 72 thus arranged to be rotatable with the motor output shaft 68 is a photoelectric pickup device 76 having light emitter and photoelectric transducer elements (not shown) incorporated therein. These light emitter and photoelectric transducer elements are fixedly located in a manner that the outer peripheral portion of the disk 72 intervenes between the elements. Each time the disk 72 makes a full turn about the center axis of the motor output shaft 68, the photoelectric transducer element of the pickup device 76 produces an electric signal with a single voltage surge. Thus, the pickup device 76 is operative to produce the swing angle signal $S_{SA}$ in the form of recurrent voltage surges variable in number with the number N of full turns of the disk 72 about the center axis of the shaft 68. The number of the voltage surges of the signal produced by the device 76 is accordingly indicative of the number of the rocking motions produced by the printer reflector mirror 36 during preliminary scanning operation. In the print mirror system under consideration, it is assumed by way of example that the motor $M_1$ is controlled to produce two turns during each preliminary scanning operation. As a consequence, the swing angle sensor 58 produces the swing angle signal $S_{SA}$ which varies in voltage in two successive cycles when an image frame on the microfilm strip S is continuously scanned from one longitudinal end of the frame F to the other.

The beam of light reflected from the second printer reflector mirror 36 is directed to the movable third printer reflector mirror 38 and is re-directed by the reflector mirror 38 and the stationary fourth printer reflector mirror 40 toward the photosensitive drum 34. The beam of light to be incident from the reflector mirror 40 onto the drum 34 is monitored by the light intensity sensor 54 fixedly located in the vicinity of the drum 34. The first and third printer reflector mirrors 28 and 38 has parallel translatory motions as previously described and are adapted to continuously scan an image frame on the microfilm strip S lengthwise from one end of the frame toward the other. The axis of rocking motions of the second printer reflector mirror 36 is perpendicular to the directions of the parallel translatory motions of these first and third printer reflector mirrors 28 and 38. Accordingly, the second printer reflector mirror 36 is in effect operative to scan the image frame widthwise from one end of the frame toward the other while the first and second printer reflector mirrors 28 and 38 are being moved from the positions $28_{p1}$ and $38_{p1}$ toward the positions $28_{p2}$ and $38_{p2}$, respectively, thereof. The result is that, during preliminary scanning in a print mode of operation, the light intensity sensor 54 is enabled to produce as the light intensity signal $S_{LI}$ a signal indicating the density at any point of a certain patterned image zone of an image frame of the microfilm strip S. Such a patterned image zone varies with the signal $S_{SA}$ produced by the swing angle sensor 58 as exemplified by a curve D demonstrated with respect to an image frame F of a microfilm strip in FIG. 6.

In a negative-positive microfilm discriminating system embodying the present invention, the signal $S_{LI}$ by the light intensity sensor is utilized for the detection of the exposure volume used to scan a microfilm strip and for the detection of the density distributions along the patterned image zone D. The density distribution thus represented by the signal $V_{L1}$ in turn is utilized for the discrimination of the image frame between negative and positive during preliminary scanning of the image frame in a print mode of operation as will be described in mode detail.

Figure 6:
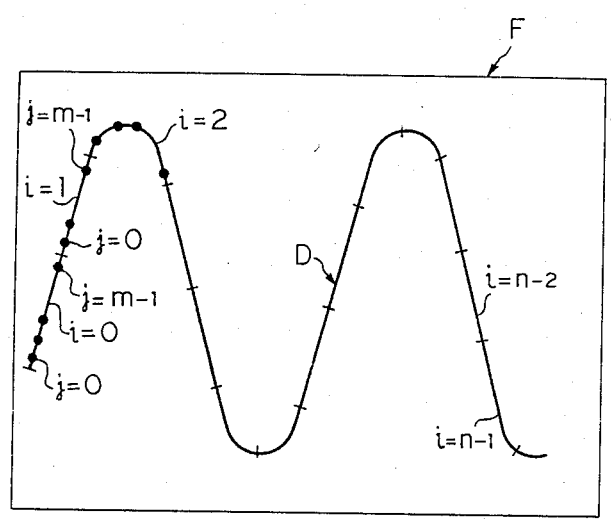
FIG. 6 is a diagram showing a patterned image zone along which the distribution of density is to be detected from an image frame of a microfilm strip by means of a density sensor (or otherwise referred to as a light intensity sensor) provided in association with the mirror systems illustrated in FIGS. 1 to 3.

In the embodiment of the present invention, the number N of full turns which the cam member 70 is to make for the detection of the density distribution along the zone D is assumed to be two by way of example. The preliminary scanning of the microfilm strip S is thus terminated when the cam member 70 is driven to make two full turns by the motor $M_1$ with the mirrors 28 and 38 moved to the respective positions $28_{p2}$ and $38_{p2}$ thereof. In addition, the patterned image zone D defined with respect to an image frame of a microfilm strip by the signal $S_{SA}$ produced by the swing angle sensor 58 as shown in FIG. 6 is segmented into an n number of successive image blocks 0 to n-1 which are generally represented by block number i. For each of such image blocks, the density of image is to be repeatedly detected at an m number of successive spots 0 to m-1 which are generally represented by spot number j. By preference, the patterned image zone D may be divided into a total of 22 blocks (n=23) each having a total of 20 spots (m=21).

Figure 7:
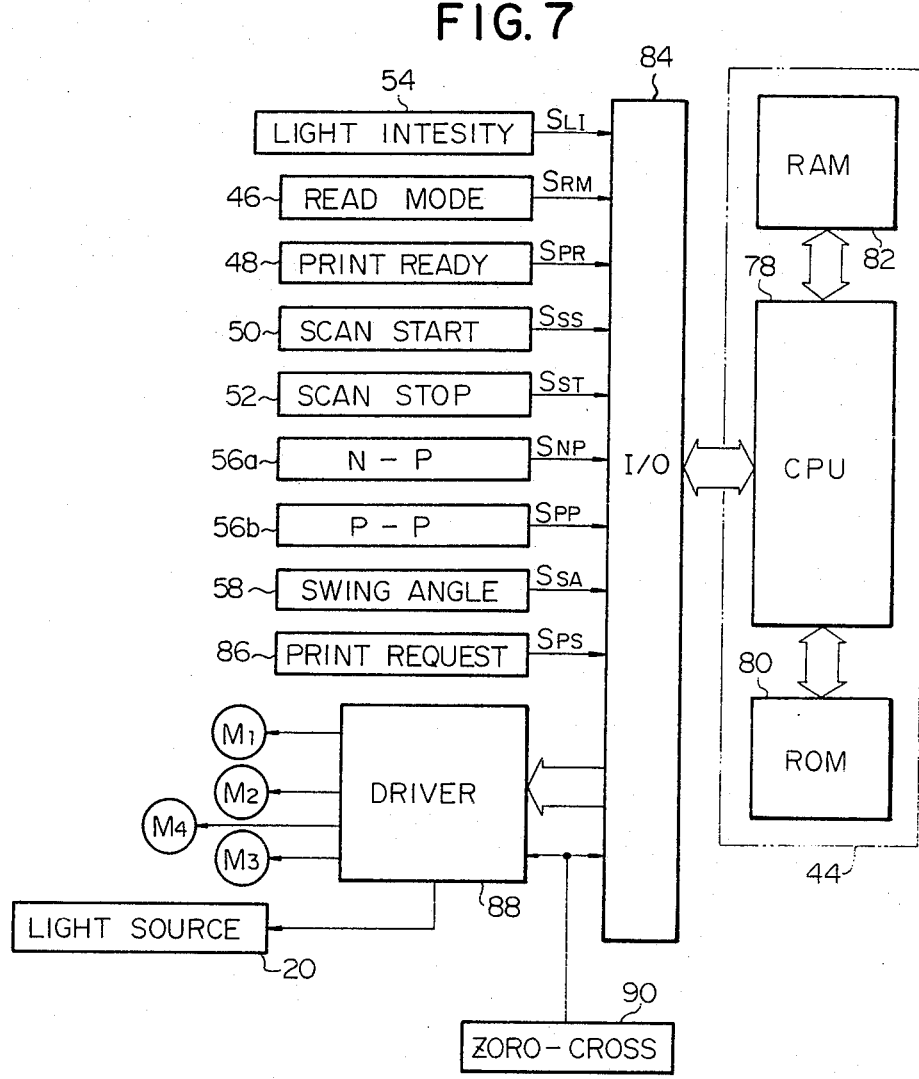
FIG. 7 is a circuit diagram showing the general circuit arrangement of a control circuit incorporated and in the apparatus to which the present invention appertains and the connections of the circuit with various input and output networks also included in the apparatus.

FIG. 7 shows the general circuit arrangement of the control circuit 44 and the connections of the circuit 44 with various input and output networks. The control circuit 44 per se comprises a central processing unit 78 coupled to a read-only memory 80 (ROM) and a random-access memory 82 (RAM) an has input and output ports connected to an input/output buffer circuit 84. The read-only memory 80 has stored therein a set of instructions and data in accordance with which the central processing unit 78 is to operate the routine and subroutine programs. The input/output buffer circuit 84 has input terminals connected to various sensors and detectors provided in the apparatus. As described previously, these sensors and detectors include the sensors 46 and 48 to produce the read mode and print ready signals $S_{RM}$ and $S_{PR}$, respectively; the sensors 50 and 52 to produce the scan start and stop signals $S_{SS}$ and $S_{ST}$, respectively; the sensors 56a and 56b to produce the signals $S_{NP}$ and $S_{PP}$, respectively; and the sensor 58 to produce the swing angle signal $S_{SA}$. Further included in the sensors and detectors connected to the buffer circuit 84 are the sensor 54 to produce the light intensity signal $S_{LI}$ and a print start sensor 86 adapted to produce a print start signal $S_{PS}$ in response to a print request switch (not shown) manually actuated by the operator.

The input/output buffer circuit 84 further has output terminals including those connected in parallel to a driver circuit 88 to actuate various drive means for the movable and/or rockable reflector mirrors included in the read and print mirror systems described with reference to FIGS. 1 to 3. The drive means comprises, in addition to the motor $M_1$ for driving the second printer reflector mirror 36 to swing from the position 36a to the position 36b, a motor $M_2$ for driving the first reader reflector mirror 26 from the position 26r to the position 26p or backwardly from the position 26p to the position 26r and a motor $M_3$ for driving the first printer reflector mirror 28 from the position 38r to the positions $38_{p1}$ and $38_{p2}$ or backwardly from the position $38_{p2}$ to the positions $38_{p1}$ and 38r. The motor $M_3$ is also associated with the first printer reflector mirror 38 and is operative to drive the printer reflector mirror 38 from the position 38r to the positions $38_{p1}$ and $38_{p2}$ or backwardly from the position $38_{p2}$ to the positions $38_{p1}$ and 38r. Each of the motors $M_2$ and $M_3$ is of the reversible type. The output terminals of the input/output buffer circuit 84 further include those connected to a motor $M_4$ and the light source unit 20. The motor $M_4$ is provided in association with the developing unit 42 and is operative to drive rollers (not shown) of a selected one of the two developing stages 42a and 42b of the unit 42. The light source unit 20 is to be energized with an a.c. voltage $V_{LS}$ which is regulated for levels respectively proper for the negative-to-positive and positive-to-positive reproduction of the microfilm strip S.

There is further provided a zero-cross detector circuit 90 which is responsive to the voltage applied to the light source unit 20 to detect the crossing of the voltage through a zero level. A signal is thus output from the zero-cross detector circuit 90 each time the voltage applied to the light source unit 20 crosses the zero level. The signal is used for the determination of the timings at which the light intensity sensor 54 is to operate for detecting the density distribution of an image frame during preliminary scanning in a print mode of operation, as will be described in more detail. The circuit arrangement of such a zero-cross detector circuit 90 per se is well known in the art and may be readily designed with use of a known Schmitt trigger circuit or a combination of an operational amplifier and a diode bridge network, though not shown in the drawings.

FIG. 8 is a flowchart showing an example of the main routine program which may be executed by the central processing unit 78 which forms part of the control circuit 44 included in the arrangement illustrated in FIG. 7. The routine program herein shown is started with the power supply switch (not shown) of the apparatus closed manually by the operator and first proceeds to a step A01 to initialize the central processing unit 78 so that all the optional parameters and selectable modes of operation are selected in accordance with default rules. Upon completion of the initializing process, the central processing unit 78 immediately executes a read mode subroutine A02 and, in the presence of a print start signal $S_{PS}$ as confirmed at a subsequent step A03, further executes a print mode subroutine A04. The print start signal $S_{PS}$ is produced from the print start sensor 86 with the print request switch depressed by the operator. When the print mode subroutine A04 is complete, the central processing unit 78 reverts to the read mode subroutine A02 to repeat the subroutine A02, step A03 and subroutine A04.

Figure 9C:
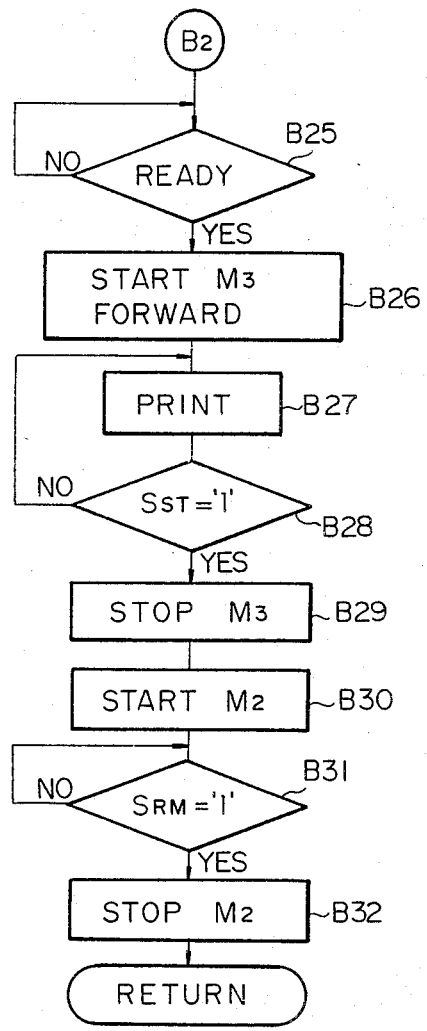

FIGS. 9A to 9C are flowcharts showing the steps of the print mode subroutine included in the routine program above described. The print mode subroutine starts with a step B01 at which an instruction signal issued from the central processing unit 78 so that the motor $M_2$ associated with the first reader reflector mirror 26 is actuated to drive the reader reflector mirror 26 to move from the position $26r$ to the position $26p$ to retract from the path of light from the projection lens unit 24 toward the first printer reflector mirror $28p$. It is then tested at step B02 whether or not there is present a signal $S_{PR}$ produced from the print ready sensor 48 with the reader reflector mirror 26 moved to the position $26p$. When it is confirmed that there is such a signal $S_{PR}$, an instruction signal issued from the central processing unit 78 to bring the motor $M_2$ to a stop and to turn on the light source unit 20 at a subsequent step B03. The light source unit 20 is thereafter maintained energized with a constant voltage applied thereto until it is turned off at a future step.

The step B03 is followed by a step B04 at which an instruction signal issued from the central processing unit 78 to actuate the motor $M_3$ to operate in reverse direction so that the first printer reflector mirror 28 which has been maintained in the retracted position $28r$ thereof is tilted up to the position $28_{p1}$ and further from the position $28_{p1}$ toward the position $28_{p2}$ as indicated by arrowhead a in FIGS. 2 and 3. Concurrently as the printer reflector mirror 28 is thus moved from the position $28r$ to the position $28_{p2}$, the third printer reflector mirror 38 which has been held in the retracted position $38r$ thereof is moved through the position $38_{p1}$ toward the position $38_{p2}$ as indicated by arrowhead c in FIG. 1. While the printer reflector mirrors 28 and 38 are being moved, the motor $M_1$ is actuated to drive the second printer reflector mirror 36 for rocking motions with an instruction signal issued from the central processing unit 78 at a step B05. With the printer reflector mirrors 28, 36 and 38 thus initiated into motion at steps B04 and B05, a preliminary scanning of the microfilm strip S is started.

During the preliminary scanning of the microfilm strip S thus started, the block number i representative of the individual image blocks of the patterned image zone D of the image frame and the number j (=0 to m-1) indicative of the successive spots at which the density is to be repeatedly detected for the image block indicated by the number i (=0 to n-1) are set at zeros as at steps B06 and B07. Thereupon, the density distribution of the image frame of the microfilm strip S currently located in the path of light through the projection lens 22 is detected for the blocks 0 to n-1 of the patterned image zone D of the image frame by a density detect subroutine B08. The details of this density detect subroutine B08 will be later described with reference to FIG. 10. When it is confirmed at step B09 that detection of such density distribution is complete by the time the cam member 70 of the sensor 54 is driven to make two full turns, the central processing unit 78 proceeds to step B10 to issue an instruction signal to bring the motor $M_1$ to a stop.

Subsequently to the step B10, it is queried at step B11 (FIG. 9B) whether or not the scan start signal $S_{SS}$ is output from the sensor 50 with the third printer reflector mirror 38 moved to the position $38_{p2}$ thereof. By the point of time the cam member 70 of the sensor 54 has made two full turns, the first and third printer reflector mirrors 28 and 38 have reached the positions $28_{p2}$ and $38_{p2}$, respectively. The answer for the step B11 being accordingly given in the affirmative, the motor $M_3$ is brought to a stop with an instruction signal issued from the central processing unit 78 at step B12. At this step B12 is also turned off the light source unit 20. After the motor $M_3$ is thus brought to a stop and the light source unit 20 turned off, it is discriminated whether the image frame currently in use is negative or positive. Such discrimination is made by execution of a negative/positive frame discriminate subroutine B13, the details of which will be later described with reference to FIG. 14.

Upon termination of the subroutine B13, it is tested at step B14 whether or not the image frame currently in use has been discriminated to be a negative or in a positive. If it is found at step B1 that the image frame currently in use has been determined to be a negative by the subroutine B13, the central processing unit 78 executes a series of steps B15 to B19. At step B15, an instruction signal issued from the central processing unit 78 to control the light source unit 20 to regulate the exposure volume to a value proper for the exposure of the negative image frame and, it if is found at step B16 that the negative-to-positive developing stage 42a has not been selected and made ready to operate, the motor $M_4$ for the developing unit 42 is actuated to make the developing stage 42a operative with an instruction signal issued from the central processing unit at step B17. The decision at step B16 is made through detection of the signal $S_{NP}$ produced from the negative-to-positive develop select sensor 56a associated with the stage 42a of the developing unit 42. When it is thus confirmed at step B18 that there is present the signal $S_{NP}$ from the negative-to-positive develop select sensor 56a, an instruction signal issued from the central processing unit 78 at step B19 to bring the motor $M_4$ to a stop.

On the other hand, if it is found at step B14 that the image frame currently in use has been determined to be a positive by the subroutine B13, the central processing unit 78 executes a series of steps B20 to B24. At step B20, an instruction signal issued from the central processing unit 78 to control the light source unit 20 to regulate the exposure volume to a value proper for the exposure of the positive image frame and, if it is found at step B21 that the positive-to-positive developing stage 42b has not been selected and made ready to operate, the motor $M_4$ is actuated to make the developing stage 42b operative with an instruction signal issued from the central processing unit at step B22. The decision at step B21 is made through detection of the signal $S_{PP}$ produced from the positive-to-positive develop select sensor 56b associated with the stage 42b of the developing unit 42. When it is thus confirmed at step B23 that there is present the signal $S_{PP}$ from the positive-to-positive develop select sensor 56b, an instruction signal issued from the central processing unit 78 at step B24 to bring the motor M4 to a stop.

Subsequently to step B19 or B24 or if it is found at step B16 that the negative-to-positive developing stage 42a has been selected or at step B21 that the positive-to-positive developing stage 42b has been selected, the central processing unit 78 proceeds to a decision step B25 shown in FIG. 9C. At this step B25 is queried whether or not the conditions to start reproduction of the original image frame are complete so that the apparatus is ready for printing operation. When the answer for the step B25 is given in the affirmative, then an instruction signal issued from the central processing unit 78 at step B26 to actuate the motor M3 for operation in forward direction. Accordingly, the first and third printer reflector mirrors 28 and 38 which have been moved to the positions $28_{p2}$ and $38_{p2}$ are moved back toward the positions $28_{p1}$ and $38_{p1}$ as indicated by arrowheads b and d, respectively. The real scanning of the image frame currently in use of the microfilm strip S is now started by means of the first and third printer reflector mirrors 28 and 38 with the second printer reflector mirror 36 held in the position 36b thereof.

While the first and third printer reflector mirrors 28 and 38 are thus initiated into motion for the real scanning operation, an instruction signal issued from the central processing unit 78 at step B27 to start the printing operation with the photosensitive drum 34 driven for rotation and irradiated with an image-carrying beam of light continuously incident on the sensitized peripheral surface of the drum 34. It may be herein noted that the printing operation is thus performed after the image frame is discriminated to be negative or positive and the exposure volume to be put to use has been regulated properly depending on the result of such discrimination. For these reasons, there can be obtained a positively reproduced image having a constant density distribution whether the image frame used is a negative or a positive.

When the first and third printer reflector mirrors 28 and 38 reach the positions $28_{p1}$ and $38_{p1}$, respectively, thereof the sensor 52 associated with the mirror 38 produces the scan stop signal $S_{ST}$. When it is confirmed at step B28 that there is the scan stop signal $S_{ST}$ thus produced by the sensor 52, instruction signals are issued from the central processing unit 78 at steps B29 and B30 to stop the motor M3 associated with the first and third printer reflector mirrors 28 and 38 and in turn start the motor M2 associated with the first reader reflector mirror 26. The motor M2 is now actuated to operate in reverse direction so that the first reader reflector mirror 26 which has stayed in the retracted position 26p thereof is driven to move toward the initial position 26r. When the first reader reflector mirror 26 reaches the position 26r, the sensor 46 associated with the mirror 26 produces the read mode signal $S_{RM}$. When it is confirmed at step B31 that there is the read mode signal $S_{RM}$ thus produced by the sensor 46, an instruction signal is issued from the central processing unit 78 at step B32 to bring the motor M2 to a full stop. With the motor M2 thus brought to a full stop, the central processing unit 78 reverts to the read mode subroutine A02 of the main routine program illustrated in FIG. 8.

Figure 10:
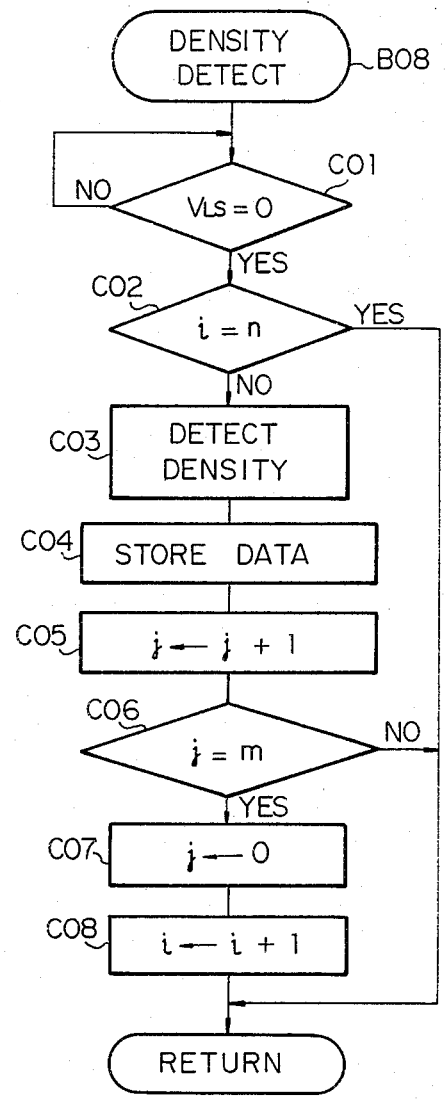
FIG. 10 is a flowchart showing the steps of a density detect ss included in the ss program illustrated in FIGS. 9A, 9B and 9C.

FIG. 10 shows the steps of the density detect subroutine B08 included in the print mode subroutine program hereinbefore described with reference to FIGS. 9A to 9C.

The density detect subroutine B08 starts with a decision step C01 at which is detected whether or not the voltage $V_{LS}$ supplied to the light source unit 20 is of a zero-cross value. This decision is made on the basis of the signal $S_{ZC}$ supplied from the zero-cross detector circuit 90. Each time the zero-cross signal $S_{ZC}$ is output from the zero-cross detector circuit 90 and accordingly it is detected at the step C01 that the voltage $V_{LS}$ applied to the light source unit 20 crosses the zero level, the central processing unit 78 executes a series of steps starting with a step C02. The zero-cross signal $S_{ZC}$ is used for the determination of the timings at which the light intensity sensor 54 is to operate for detecting the density distribution of an image frame during preliminary scanning in a print mode of operation.

Figure 11:
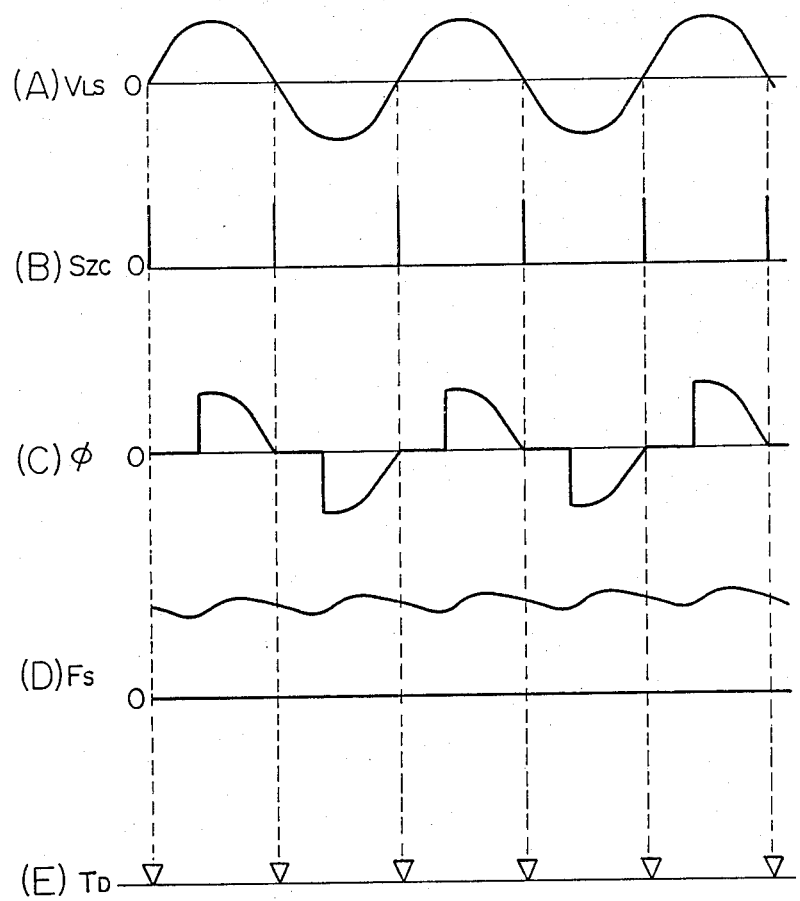
FIG. 11 is a time chart showing an example of the schedule in accordance with which the timings at which a density sensor (or light intensity sensor) used in the negative-positive microfilm discriminating system embodying the present invention are to be determined.

An example of the schedule in accordance with which such timings are to be determined on the basis of the signal $S_{ZC}$ produced by the zero-cross detector circuit 90 is graphically depicted in FIG. 11. In FIG. 11 are shown waveforms including a waveform (A) of the a.c. voltage $V_{LS}$(A) applied to the light source unit 20, a waveform (B) of the impulses produced by the signal $S_{ZC}$ from the zero-cross detector circuit 90, a waveform (C) of the phase angle $\phi$ of the voltage $V_{LS}$, a waveform (D) of the illuminance $F_S$ achieved of the light source unit 20. Indicated by section (E) of FIG. 11 are the timings at which the light intensity sensor 54 is to be actuated to operate. The a.c. voltage $V_{LS}$ applied to the light source unit 20 varies with time as indicated by the waveform (A). If the density distribution of an image frame is detected along the patterned image zone D of the image frame (FIG. 6) by the use of the single light intensity sensor 54 and if, in this instance, the density distribution of an image frame is detected at irregular timings, then the variation, in terms of time, in the quantity of light from the light sensor unit 20 would merely result in irregularities of the density distribution on a given image area and could not be used for the precise detection of the density distribution of the image frame. Meanwhile, it is considered that a fixed quantity of light is generated by the light sensor unit at the moment the voltage $V_{LS}$ crosses the zero level or at a certain point of time before or after the voltage crosses the zero level during each cycle of variation of the a.c. voltage $V_{LS}$ In the negative-positive microfilm discriminating system embodying the present invention, the light intensity sensor 54 is for this reason actuated at timings which are fixed with respect to the timings at which the voltage $V_{LS}$ applied to the light source unit 20 crosses the zero level during successive cycles of variation of the voltage $V_{LS}$. As will be seen from section (E) of FIG. 11, the light intensity sensor 54 is herein assumed to be actuated at timings synchronized with the timings at which the voltage $V_{LS}$ applied to the light source unit 20 crosses the zero level during successive cycles of variation of the voltage $V_{LS}$.

Turning back to FIG. 10, the central processing unit 78 proceeds from the step C01 to a decision step C02 when it is detected at the step C01 that the voltage $V_{LS}$ applied to the light source unit 20 crosses the zero level. At the decision step C02 is queried whether or not the number i of the image blocks of the patterned image zone D equals n, viz., if the detection of the density distribution has been complete for all the blocks of the patterned image zone D of the image frame. If it is found at the step C02 that the block number i is not yet equal to n, the step C02 is followed by a step C03 at which an instruction signal issued from the central processing unit 78 so that the light intensity sensor 54 is actuated to produce the signal $S_{LI}$. The data represented by the signal $S_{LI}$ thus output from the sensor 54 is stored into a specified memory area of the random-access memory 80 of the control circuit 44 at a subsequent step C04. The number j of the spot at which the density is to be detected for the image block currently selected of the patterned image zone D is then incremented by one at step C05, whereupon it is questioned whether or not the number j equals m at step C06. If it is determined at this step C06 that the number j of the spot at which the density has been detected for the image block currently selected is not yet equal to m, then the central processing unit 78 reverts to the step C01 to recycles the steps subsequent to the step C02 each time the voltage $V_{LS}$ applied to the light sensor unit 20 crosses the zero level.

When it is determined at step C06 that the number j of the spot at which the density has been detected for the image block currently selected equals m, then the central processing unit 78 proceeds to step C07 to shift the number j to zero and further to step C08 to increment the image block number i by one. Detection of the density distribution for the block i of the patterned image zone D segmented into an n number of image blocks is now complete and, as such, the central processing unit 78 will then detect the density distribution for the subsequent image block i+1 through reiteration of the steps C01 to C08 of the subroutine herein shown. When the detection of the density distribution is complete for all the image blocks 0 to n-1 of the patterned image zone D, the answer for the step C02 will be given in the affirmative and accordingly the central processing unit 78 terminates execution of the subroutine shown in FIG. 10.

Into a specified memory area of the random-access memory 80 is stored the data represented by the signal $S_{LI}$ indicating the density at each of the spots 0 to m-1 of each of the image blocks 0 to n-1 of the patterned image zone D is stored at step C04. For this purpose, a predetermined range of density which may be detected from an ordinary image frame of a microfilm strip is divided into, for example, 64 graduations and the central processing unit 78 determines in whichever of such graduations the densities represented by the signal $S_{LI}$ input to the unit 78 fall and thereby stores into the memory 80 the data which corresponds to the particular fraction.

In accordance with the present invention, discrimination between negative-to-positive and positive-to-positive image frames is effected basically through (1) selection of the most reasonable one of the image blocks to be used for the discrimination, (2) establishment of a reasonable criterion in accordance with which the discrimination is to be effected, and (3) reasonable treatment of the data which has resulted from the presence of dust or stains in the optical systems of the apparatus.

Selection of the most reasonable image block

An image frame bearing a solid image having uniform or largely uniform density distribution could not be visually discriminated between negative and positive by human eyes. To discriminate such an image frame between negative and positive by human intervention, attention is ordinarily focussed on an area of the frame where alternate lines and spaces appear more frequently than in other areas. The detection of density with use of an optical sensor could be tantamount to visual detection of the density by human eyes if the signal produced by the sensor is processed appropriately. This means that the most reasonable one of the image blocks to be used for the discrimination between negative-to-positive and positive-to-positive image frames is a block having alternate lines and spaces appearing more frequently than in other blocks. Such a block could be selected out of the n number of image blocks 0 to n-1 through establishment of a reasonable reference value $C_R$ of the degree of contrast. In this instance, the degrees of density variation in the density distribution in each of the image blocks are compared with such a reference value $C_R$ and a block may be accepted as the "most reasonable" image block if the degrees of density variation higher than the reference value $C_R$ occur in the particular block more frequently than in the other image blocks.

Establishment of reasonable criterion

Figure 12:
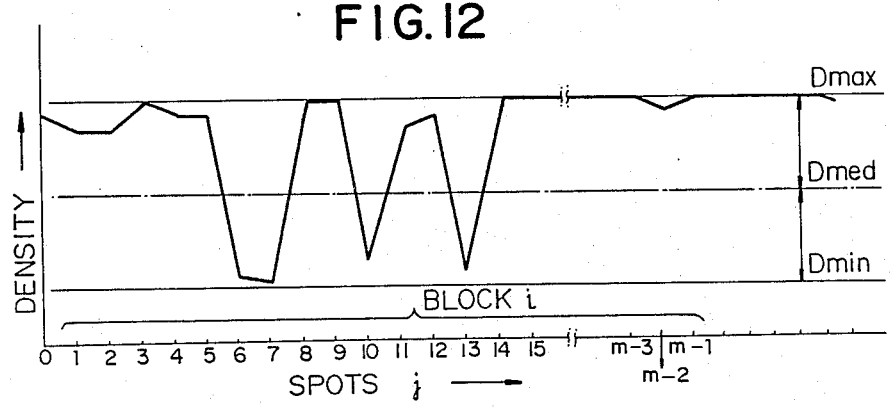
FIG. 12 is a graphic representation of the density distribution detected from an image block bearing a certain alphabetic letter in a negative image frame.

FIG. 12 is a graphic representation of the density distribution detected from an image block bearing a certain alphabetic letter in a negative image frame. In FIG. 12, the axis of abscissa stands for the successive spots 0 to m-1 of the image block and the axis of ordinate indicates the density detected at each of such spots. Indicated by lines represented by $D_{max}$ and $D_{min}$ are the maximum and minimum values, respectively, of the image densities detected and by line represented by $D_{med}$ is a median between the maximum and minimum values $D_{max}$ and $D_{min}$. As will be seen from this graphic representation, densities higher than the median $D_{med}$ appear more frequently than those lower than the median $D_{med}$ in an image block in a negative image frame. This means that the "reasonable" criterion in accordance with which the discrimination is to be made between negative and positive can be established through calculation of the median $D_{med}$ between the maximum and minimum values $D_{max}$ and $D_{min}$ of the detected image densities and comparison of the density detected at each of the spots of each image block with the median $D_{med}$. If it is found as a result of such comparison that image densities higher than the median $D_{med}$ are detected at more spots of an image block than the spots at which image densities lower than the median $D_{med}$ are detected, it is determined that the image frame is a negative and, if to the contrary, it is determined that the image frame is a positive.

Reasonable treatment of data

Figure 13A:
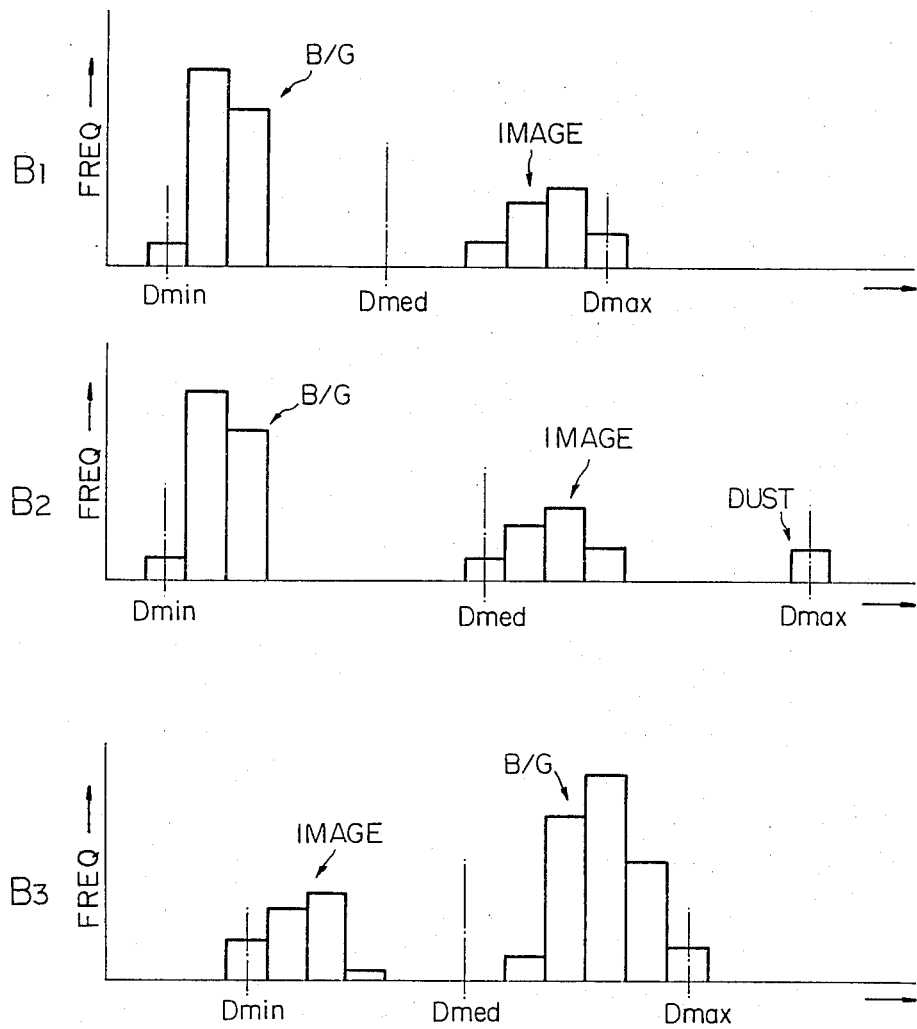

FIGS. 13A and 13B are histogrammic representations of the graduated data detected from different image blocks $B_1$ to $B_6$. On the axis of abscissa are indicated the graduations of the density which correspond to those of the density range divided into 64 graduations and on the axis of ordinate is indicated the frequencies with which the image densities are detected for each of the image blocks. Of the image blocks $B_1$ to $B_6$, the blocks $B_1$ and $B_2$ are of positive image frames and the blocks $B_3$ to $B_6$ are of negative image frames. Furthermore, the image blocks $B_3$ and $B_4$ are of negative image frames each having a relatively dark background (B/G) with a high degree of contrast while the image blocks $B_5$ and $B_6$ are of negative image frames each having a relatively clear background with a low degree of contrast. The data detected from each of the image blocks $B_1$, $B_3$ and $B_5$ has been obtained with use of clean optical systems free from dust and stains while the data detected from each of the image blocks $B_2$, $B_4$ and $B_6$ has been obtained with use of optical systems contaminated with dust.

As will be seen from the data detected from the image block $B_2$, the result of discrimination of the image frame between negative and positive will not be seriously affected by the presence of dust since the density resulting from the dust is closer to the densities of the image areas than to those of the background areas. On the other hand, it will be seen from the data detected from the image blocks $B_4$ and $B_6$ that the result of discrimination will be seriously affected by the presence of dust because of the fact that the density resulting from the dust is closer to the densities of the background areas than to those of the image areas.

As to the block $B_4$, for example, it is further observed that the image block $B_4$ has relatively high densities and relatively high degrees of contrast in its image areas and densities higher than the median $D_{med}$ are detected at more spots of the block $B_4$ than those where densities lower than $D_{med}$ are detected. When the densities detected from such an image block $B_4$ are compared with the median $D_{med}$, the result of discrimination of the block between negative and positive will not be seriously affected by the data resulting from the presence of the dust. On the other hand, the block $B_6$ has relatively low densities and relatively low degrees of contrast in its image areas and the median $D_{med}$ between the minimum and maximum values $D_{min}$ and $D_{max}$ is largely equal to the maximum value of the densities detected from the background areas of the block $B_6$ due to the presence of the dust. As a consequence, densities lower than the median $D_{med}$ are detected at far more spots of the block $B_6$ than those where densities higher than the median $D_{med}$ are detected. This would result in error in the result of discrimination of the block $B_6$ between negative and positive. To avoid such erred discrimination of an image block between negative and positive, two major criteria are herein established.

In accordance with one of these criteria, it is determined to discard a fraction of the data as useless if the fraction of the data indicative of the densities detected at the individual spots in an image block is representative of a density occurring at less than 1% of the total number of spots included in the block. By adoption of this criteria, such data as would have resulted from the presence of dust and stains in the optical systems or from errors caused in the process of detection can be eliminated satisfactorily.

In accordance with the other criterion, it is determined that any data representative of a density detected at not more than 5% of the total number of spots included in an image block is to be put to use if the graduation indicating the density has an immediately adjacent density graduation on at least one side of the former. If there is no density graduation immediately adjacent to the graduation indicating the density detected at not more than 5% of the total number of spots included in the block, then the density detected at not more than 5% of the spots is to be disregarded. The data representative of the density detected at not more than 5% of the total number of spots of a block may include data representative of the densities detected from the image areas of the block. In consideration, however, of the fact that the data representative of the densities detected from image areas of a block are in ordinary cases distributed over a plurality of density graduations, data indicating the densities detected from the image areas of the block could not be thoroughly disregarded. It may be further pointed out that the presence of dust or a stained spot ordinarily results in a density which is conspicuously distinct from the densities of ordinary image and background areas. Because of this fact, data resulting from the presence of dust and stains can be automatically eliminated through adoption of the second criterion.

By virtue of the two criteria thus used in discriminating an image block between negative and positive, the data detected from the image block $B_2$ is modified or "cleaned" to be similar to, for example, the data detected from the image block $B_1$ and the data detected from the image block $B_4$ is modified to be similar to, for example, the data detected from the image block $B_3$. The data detected from the image block $B_6$ is modified to be similar to, for example, the data detected from the image block $B_5$. Generally, data detected from an image block containing dust or a stain is modified into data detected from an image block similar to the former but free from dust or a stain. While only dust or a stain on an image film has hereinbefore taken into consideration, a scratch on a microfilm strip or a scratch, stain or dust in the optical systems would be detected as a density. Since such a density is also conspicuously distinct from the densities of ordinary image and background areas, data representative of the density can be automatically eliminated through adoption of the hereinbefore described first and second criteria.

Figure 14:
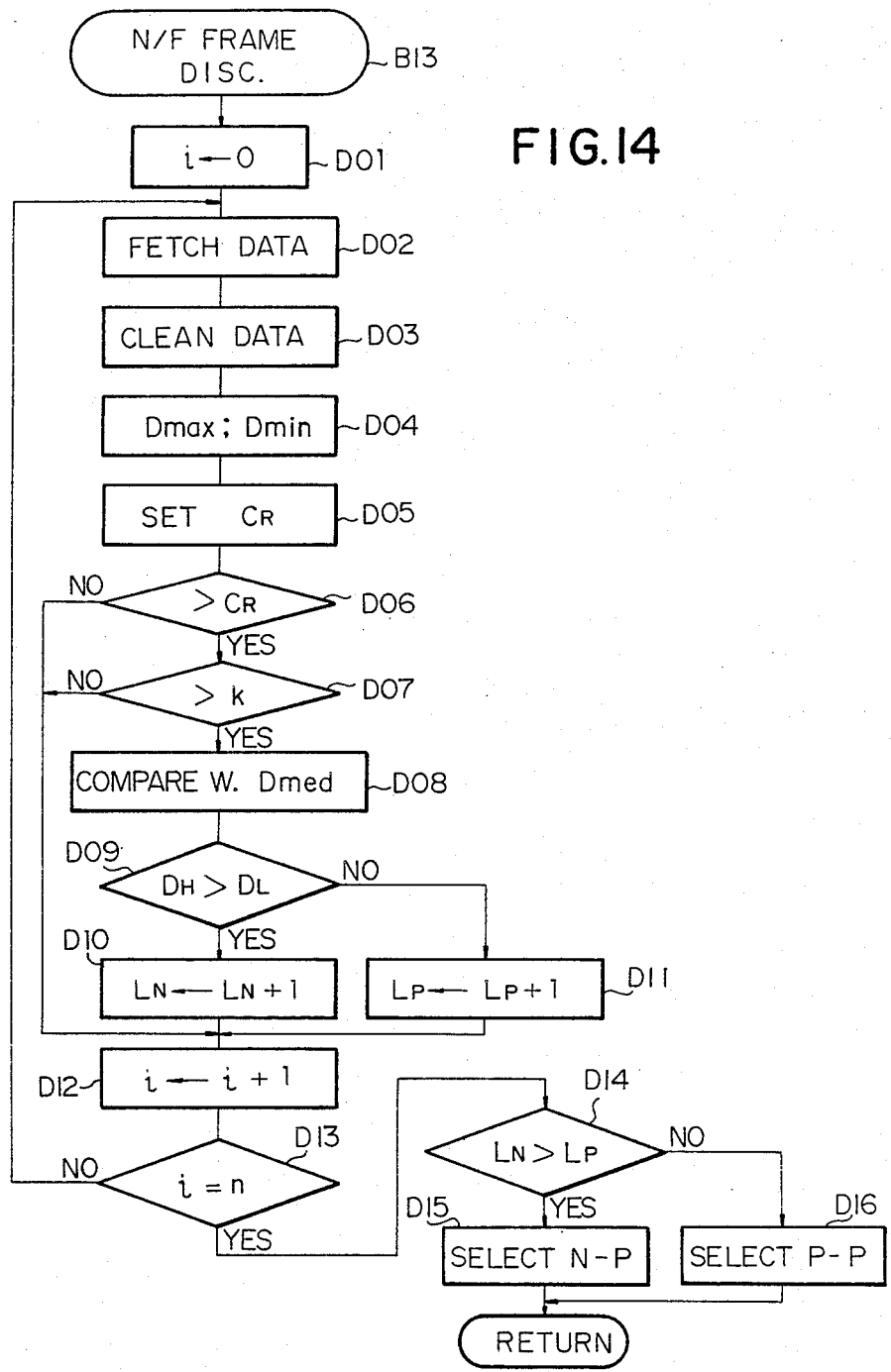
FIG. 14 is a flowchart showing the steps of a negative/positive frame discriminate ss also included in the ss program illustrated in FIG. 9.

FIG. 14 shows the steps of the negative/positive frame discriminate subroutine B13 included in the print mode subroutine program described with reference to FIGS. 9A to 9C. The negative/positive frame discriminate subroutine B13 is adapted to discriminate an image frame between negative and positive on the basis of the above described two criteria proposed by the present invention. Such criteria are stored in the read-only memory 78 included in the control circuit 44 shown in FIG. 7.

The negative/positive frame discriminate subroutine B13 starts with a step D01 at which the image block number i is set at zero and thereupon proceeds to a step D02 at which the data representing the density detected from the first image block numbered 0 is fetched from the random-access memory 80 in the control circuit 44. It may be noted that the data thus read out from the memory 80 is expressed similarly to the data shown in FIG. 14. The central processing unit 78 then processes the data at step D03 to "clean" or modify the data fetched, viz., remove the graduations representative of the densities detected from the dust or stains which may be present in the block 0. This step D03 is executed in accordance with the two criteria hereinbefore described.

The central processing unit 78 then proceeds to step D04 to calculate the maximum and minimum values $D_{max}$ and $D_{min}$ of the densities represented by the data thus cleared of the fractions resulting from the existence of dust and stains. The step D04 is followed by a step D05 at which a reference value $C_R$ for evaluating the degree of contrast is set up. This reference value $C_R$ is determined to be proportional to the maximum value $D_{max}$ of the densitied represented by the modified data and is, thus, expressed:

$$C_R = a \times D_{max},$$

where a is a constant of the order of, for example, 0.3.

After the reference value $C_R$ is in this manner set up at step D05, it is tested at step D06 whether or not the block 0 has acceptable degrees of contrast. Such a decision is made by testing if the density detected at a certain spot within the block 0 is higher or lower than the reference value $C_R$ when the density detected at the immediately preceding spot in the block 0 is lower or higher, respectively. In other words, the block 0 is determined to have degrees of density variation providing the acceptable degrees of contrast when the densities detected at neighboring ones of the spots within the block 0 are found to range across the reference value $C_R$. If the answer for the decision step D06 is given in the affirmative, it is further tested at step D07 whether or not the degrees of density variation higher than the reference value $C_R$ occur at a k number of spots or more in the particular block 0, the value of k being preferably selected at 4. The block 0 is accepted as a reasonable image block if the degrees of density variation higher than the reference value $C_R$ are found to occur at such a number of spots or more. When the block 0 is thus accepted at step D07, the central processing unit 78 counts the number $D_H$ of the spots at which densities are higher than the median $D_{med}$ and the number $D_L$ of the spots at which densities are lower than the median $D_{med}$. It is then detected at step D09 whether or not the number $D_H$ of the spots at which densities are higher than the median $D_{med}$ is larger than the number $D_L$ of the spots at which densities are lower than the median $D_{med}$. If it is found at this step D09 that the number $D_H$ of spots is larger than the number $D_L$ of spots, the block 0 under consideration is determined to be a negative image block and as such a negative count value $L_N$ is incremented by one at step D10. If it is found at step D09 that the number $D_H$ of spots is less than the number $D_L$ of spots, the block 0 is determined to be a positive image block and as such a positive count value $L_P$ is incremented by one at step D11.

Subsequently to step D10 or S11 or if the answer for step D06 or step D07 is given in the negative, the image block number i is incremented by one at step D12. Upon confirmation at step D13 that the block number i is not n, the central processing unit 78 thereafter reverts to step D02 to repeat the series of steps until it is determined step D13 that the block number i has reached n. When it is found that the block number i is n, the final negative and positive count values $L_N$ and $L_P$ which have been incremented a total of i number of times are compared with each other as at step D14 to finally determine whether or not the image frame under consideration is a positive or a negative.

If it is determined at step D14 that the image frame is a negative, the central processing unit 78 issues at step D15 an instruction signal to select the negative-to-positive stage 42a of the developing unit 42. If it is determined at step D14 that the image frame is a positive, then the central processing unit 78 issues at step D16 an instruction signal to select the positive-to-positive stage 42b of the developing unit 42.

While it has been assumed that the patterned image zone D as defined on an image frame is to be divided into a plurality of segments, the present invention may be put into practice if densities are detected at a plurality of spots on such a zone and, for this reason, the patterned image zone D may not be necessarily divided into a plurality of segments. While, furthermore, it has been described that any data representative of a density detected at not more than 5% of the total number of spots included in an image block is to be disregarded in accordance with the second criterion, such a numerical value may be varied appropriately by preference.

It may be further noted that a single density sensor (implemented by the light intensity sensor 54) is used in the described embodiment of the present invention and is, in effect, moved with respect to an image frame so that the signal continuously produced by the sensor is sampled at controlled timings but, if desired, two or more such sensors may be provided to produce two or more sets of density data.

As will have been appreciated from the foregoing description, a negative-positive microfilm discriminating system according to the present invention is capable of discriminating an image frame of a microfilm strip between negative and positive directly from the image on the frame through detection of the densities at a plurality of spots within the frame. Data in the form of a histogram is formulated from the densities thus detected at the plurality of spots within the image frame and any fraction of the data determined to have resulted from the presence of a stain or dust on the image frame per se or in the optical arrangement of the system. The effect resulting from the presence of such a stain or dust is thus eliminated satisfactorily so that discrimination of the frame or the microfilm strip between negative and positive can be made with sufficient reliability and accuracy.

What is claimed is:

1. A negative-positive microfilm discriminating system for use in a microfilm handling apparatus, comprising
   (a) density detecting means for detecting the densities at a plurality of spots within an image zone of a microfilm strip,
   (b) means for discarding a fraction of the density data when the fraction of the data is representative of a density occurring at less than a predetermined percentage of the total number of spots,
   (c) negative-positive discriminating means for discriminating whether said microfilm strip is a negative or a positive on the basis of the remaining fraction of the density data.

2. A negative-positive microfilm discriminating system as set forth in claim 1, in which said predetermined percentage is 1 percent.

3. A negative-positive microfilm discriminating system as set forth in claim 1, in which said discarding means is operative to disregard a fraction of said data if the fraction of the data is representative of a density detected at not more than a second predetermined percentage of the total number of spots in each of said spots and if there is no density detected which is immediately adjacent in graduation to the density represented by said fraction.

4. A negative-positive microfilm discriminating system as set forth in claim 3, in which said second predetermined percentage is 5 percent.

5. An improved method of discriminating a negative from a positive image for use in a microfilm reader/printer, the improvement comprising:
   measuring the density of a plurality of spots throughout an image;
   determining the frequency with which each density in a gradation of densities occurs;

discarding those spot density measurements whose frequency of occurrence totals less than a first predetermined percentage of the total number of spot density measurements;

discarding those spot density measurements whose frequency of occurrence totals less than a second predetermined percentage of the total number of spot density measurements and are not located directly adjacent to another spot density measurement in the gradation of densities, and discriminating a negative from a positive image on the basis of the undiscarded spot density measurements.

6. The method of claim 5 wherein the first predetermined percentage is one percent (1%).

7. The method of claim 5 wherein the second predetermined percentage is five percent (5%).

* * * * *